(12) United States Patent
Yamaguchi

(10) Patent No.: US 6,546,200 B2
(45) Date of Patent: Apr. 8, 2003

(54) LENS INTERLOCK MECHANISM AND LENS INTERLOCK METHOD, CAMERA AND PORTABLE TERMINAL HAVING LENS INTERLOCK MECHANISM

(75) Inventor: Kunihisa Yamaguchi, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/851,130

(22) Filed: May 9, 2001

(65) Prior Publication Data

US 2002/0003955 A1 Jan. 10, 2002

(30) Foreign Application Priority Data

May 16, 2000 (JP) ........................................ 2000-143488

(51) Int. Cl.[7] .............................. G03B 17/00; G03B 3/10
(52) U.S. Cl. .............................. 396/79; 396/83; 396/132
(58) Field of Search .............................. 396/72, 75, 79, 396/82, 83, 132, 133

(56) References Cited

U.S. PATENT DOCUMENTS 5,724,194 A * 3/1998 Ishikawa .................... 359/696

* cited by examiner

Primary Examiner—Alan A. Mathews
Assistant Examiner—Arthur A Smith
(74) Attorney, Agent, or Firm—Oblon, Spivak, McClelland, Maier & Neustadt, P.C.

(57) ABSTRACT

The lens interlock mechanism includes the first driving unit, the second driving unit, and the third driving unit. The first driving unit moves the zoom lens along the optical axis direction of the zoom lens while giving a first driving force corresponding to the movement of the zoom lens to the third driving unit. The second driving unit gives a second driving force corresponding to a distance between the subject to the third drive unit. The third driving unit receives the first and second driving force given from the first and second drive units, and thereby, moves the focus lens in its the optical axis direction while keeping a predetermined relation to the zoom lens based on the distance to the subject.

13 Claims, 6 Drawing Sheets

FIG.4C

LENS INTERLOCK MECHANISM AND LENS INTERLOCK METHOD, CAMERA AND PORTABLE TERMINAL HAVING LENS INTERLOCK MECHANISM

FIELD OF THE INVENTION

The present invention relates to a mechanism which interlocks a zoom lens and a focus lens and lens interlock method, camera and portable terminal having lens interlock mechanism.

BACKGROUND OF THE INVENTION

In recent years, a lens system having a variable focal length, what is generally called as a variable-focal lens system, has come into wise use in place of ordinary zoom lens system. The variable focal lens system is provided with a zoom lens and a focus lens between an objective lens and an eyepiece, and these zoom lens and focus lens are mutually movable independently from each other.

In the variable focal lens system, magnification of the subject is variable. However, the focal position exceeds the focal depth by the movement of zoom lens. Therefore, during the movement of zoom lens, a subject projected on a camera and a monitor of video camera gradually becomes an out-of-focus image with the movement of the zoom lens and a desired image is not obtained.

In order to cancel the above out-of-focus, various focus correcting techniques have been known. For example, there is a technique of alternately carrying out the movement of zoom lens and the movement of focus lens, and thereby, canceling the out-of-focus during zoom operation. Moreover, there is a technique of moving the zoom lens to a desired position while allowing the out-of-focus, and thereafter, carrying out an AF (auto-focus) operation, and thereby, canceling the out-of-focus after zooming operation.

However, according to the conventional techniques, during the movement of zoom lens, it is impossible to smoothly and continuously produce an image having almost no out-of-focus.

More specifically, according to the former conventional technique, the movement of zoom lens and the movement of focus lens are alternately carried out. Thus, these lenses are intermittently operated, and a zooming operation becomes slow; as a result, time takes to move a zoom lens to a desired position. For this reason, during the movement of the zoom lens, it is slow to produce an image having no out-of-focus. Therefore, a problem has arisen such that it is difficult to smoothly and continuously produce an image having almost no out-of-focus during the movement of the zoom lens.

Moreover, according to the latter conventional technique, the zoom lens is moved to a desired position while allowing an out-of-focus, and thereafter, an AF (auto-focus) operation is carried out. Thus, as a zoom ratio becomes large, an out-of-focus becomes large with the movement of the zoom lens. For this reason, it is impossible to always produce an image having no out-of-focus. Therefore, a problem has arisen such that it is difficult to continuously produce an image having almost no out-of-focus during the movement of the zoom lens.

The above problems become more prominent because of the recent photographic style. These days, it is general practice to select an object while confirming an image of the subject projected on a camera and a monitor of video camera. In this photographic style, in order to enable a photographic object to select while confirming a subject image projected on a monitor and the like, the subject image needs to be sufficiently confirmed by the monitor or the like even during a zooming operation. Therefore, it is desired to smoothly and continuously project an image having almost no out-of-focus on a monitor or the like during the movement of zoom lens. As described above, according to the above conventional techniques, during the movement of zoom lens, it is impossible to smoothly and continuously produce an image having almost no out-of-focus; for this reason, a problem arisen such that it is difficult to meet the demands as described above.

SUMMARY OF THE INVENTION

It is an object of this invention to provide a lens interlock mechanism and lens interlock method, camera and portable terminal having lens interlock mechanism which can smoothly and continuously produce an image having almost no out-of-focus.

The lens interlock mechanism according to this present invention includes a first driving unit which directly drives at least the zoom lens; a second driving unit which indirectly drives the focus lens; and a third driving unit which directly drives the focus lens by being driven by the first and second driving unit. The first driving unit moves the zoom lens along the optical axis direction of the zoom lens while giving a first driving force corresponding to the movement of the zoom lens to the third driving unit, the second driving unit gives a second driving force corresponding to a distance between the subject to the third driving unit, the third drive unit receives the first and second driving force and thereby moves the focus lens to the optical axis direction of the focus lens while keeping a predetermined relation to the zoom lens based on the distance to the subject.

Other objects and features of this invention will become apparent from the following description with reference to the accompanying drawings.

DESCRIPTION OF THE PREFERRED EMBODIMENTS

Preferred embodiment of a lens interlock mechanism and lens interlock method according to the present invention will be explained below with reference to the accompanying drawings. Incidentally, this embodiment shows a case where the present invention is applied to a lens system of a camera. It is to be noted that the present invention is not limited by this embodiment but it is applicable to any optical system where a zoom lens and a focus lens are interlocked with each other (i.e., a portable terminal), for example, a telescope which does not include a photographing mechanism.

Figure 1:
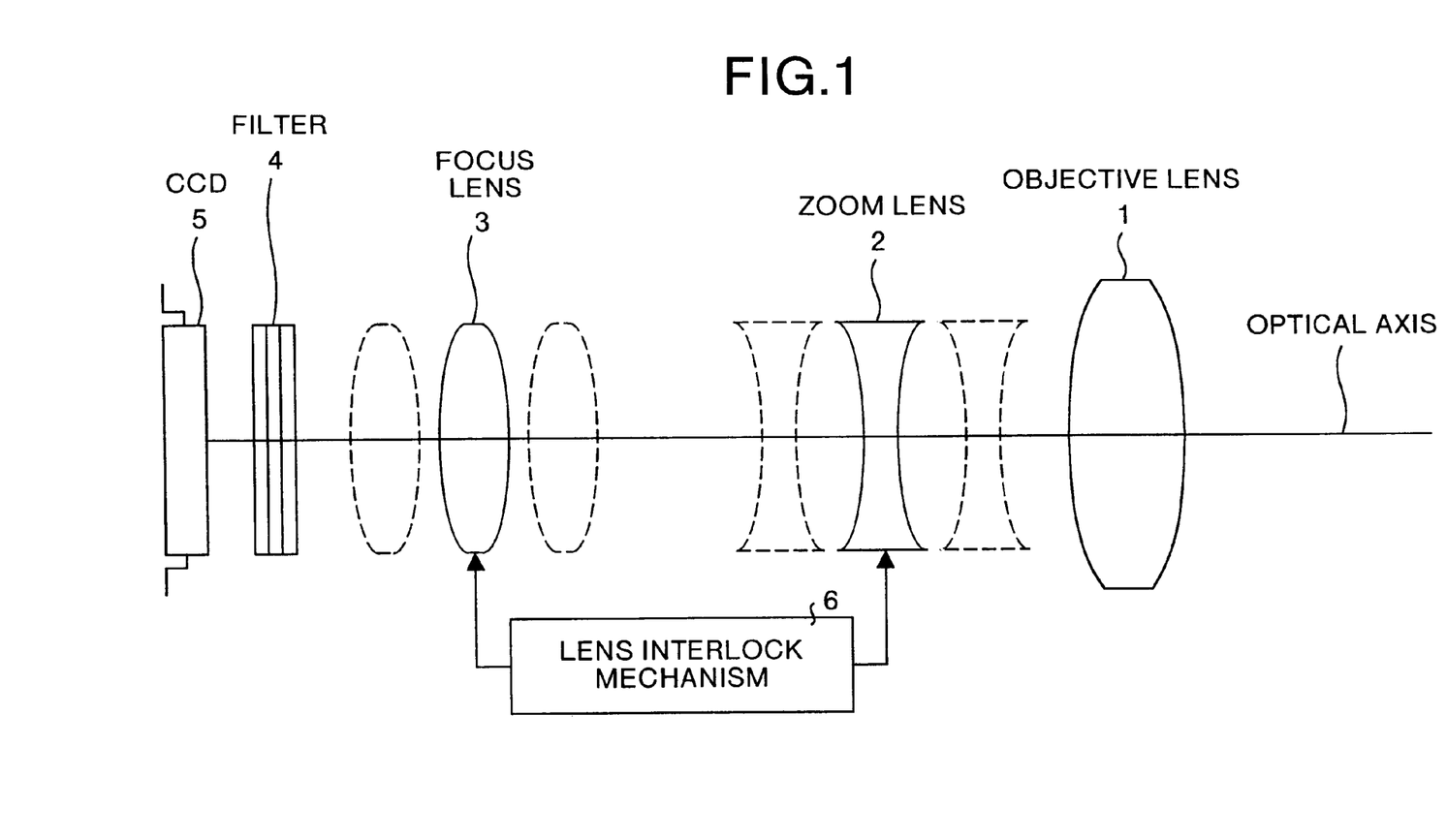
FIG. 1 is a view schematically showing a configuration of a camera lens system used in one preferred embodiment.

First, a lens interlock mechanism according to a preferred embodiment to the present invention will be described below with reference to the accompanying drawings. FIG. 1 is a view schematically showing a configuration of a camera lens system used in the preferred embodiment. The camera lens system comprises objective lens 1, zoom lens 2, focus lens 3, filter 4, CCD (Charge Coupled Device) 5, and lens interlock mechanism 6.

The objective lens 1 is fixed to a lens barrel (not shown) of camera. Further, the zoom lens 2 is a photographic lens for carrying out zoom variable power, and is movable in the lens barrel to an optical axis direction of the zoom lens 2 by a drive of the lens interlock mechanism 6. Further, the focus lens 3 is a photographic lens for making a focus correction, and is movable in the lens barrel to an optical axis direction of the focus lens 3 by a drive of the lens interlock mechanism 6.

Moreover, the filter 4 is interposed between the focus lens 3 and the CCD 5 in order to make various optical corrections taking an optical characteristic of the CCD 5 into consideration. The CCD 5 is a charged coupled device for electrically imaging a subject from a light transmitting through the objective lens 1, the zoom lens 2, the focus lens 3 and the filter 4.

The subject image imaged by the CCD 5 may be projected on a monitor (not shown) such as an LCD or the like during the movement of the zoom lens 2 and the variation of subject distance. Moreover, the subject image confirmed by the monitor may be recorded and photographed in a memory card by an external operation (e.g., depression of photography instruction button, etc.) made via an arbitrary mechanism.

The lens interlock mechanism 6 is a mechanism part for interlocking the zoom lens 2 and the focus lens 3. More specifically, the lens interlock mechanism 6 moves the zoom lens 2 to the optical axis direction of the zoom lens 2, and simultaneously, moves the focus lens 3 to the optical axis direction of the focus lens 3 while keeping a predetermined relation with respect to the zoom lens 2 corresponding to a distance between the subject. The movement of the zoom lens 2 and the movement of the focus lens 3 will be schematically described below.

First, the following is a description on the movement of the zoom lens 2. The lens interlock mechanism 6 moves the zoom lens 2 to a direction approaching the objective lens 1, and thereby, transfers a lens system from a MEAN state to a WIDE state so that a wide-range subject is gradually guided to the lens system. More specifically, by the above movement, a focal length of lens is gradually made short so that subject image imaged by the CCD 5 is projected gradually in a wide range.

On the other hand, the lens interlock mechanism 6 drives the zoom lens 2 to a direction separating from the objective lens 1, and thereby, transfers the lens system from a mean state to a TELE state so that a faraway subject is gradually guided to the lens system. More specifically, by the above movement, a focal length of lens is gradually made long so that subject image imaged by the CCD 5 is made gradually large.

Figure 2:
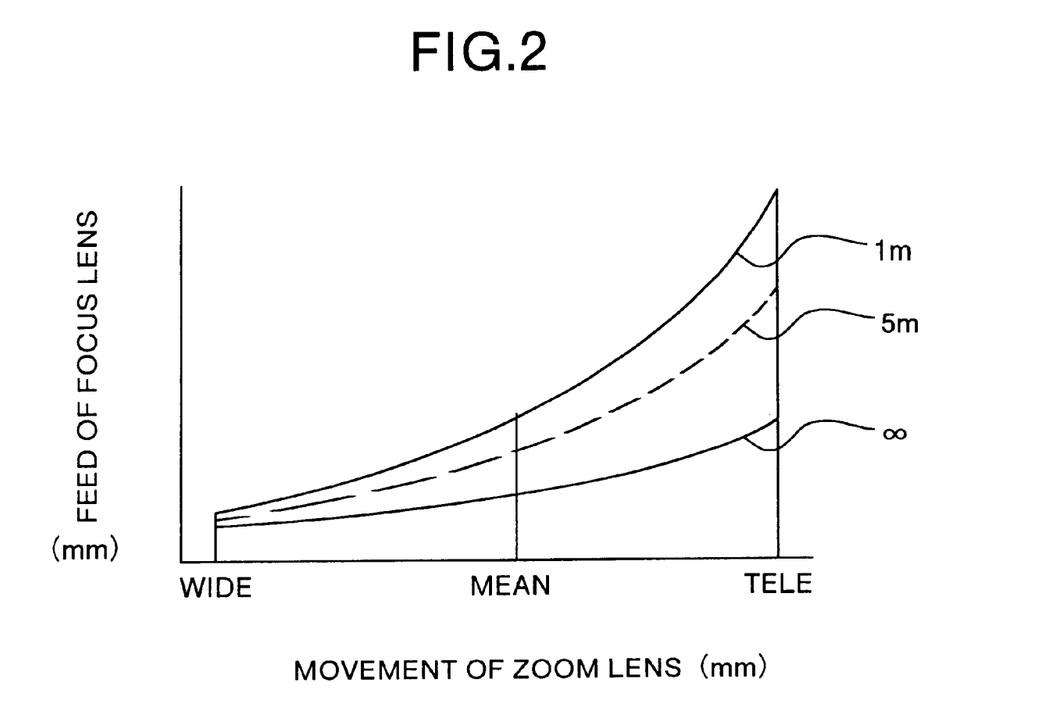
FIG. 2 is a graph showing a conventionally well-known relation between a movement rate of zoom lens, a subject distance and a feed rate of focus lens.

Next, the following is a description on the movement of the focus lens 3 by the lens interlock mechanism 6. FIG. 2 is a graph showing a conventionally well-known relation between a movement of the zoom lens 2, a subject distance and a feed of the focus lens 3. As shown in FIG. 2, the feed of the focus lens 3 (position of the focus lens 3 capable of obtaining an in-focus image) is different depending upon a movement rate (position) of the zoom lens 2, and is expressed by a plurality of curves using a subject distance as parameter.

Namely, a position (in-focus position) of the focus lens 3 capable of obtaining an in-focus image varies in accordance with the movement of the zoom lens 2 and a variation of subject distance. More specifically, the feed of the focus lens 3 becomes large in its quadratic curve in accordance with a movement of the zoom lens 2 to a TELE direction, and further, becomes large in its quadratic curve in accordance with a variation of subject distance to a short distance direction. Based on the above parameter, the lens interlock mechanism 6 moves the focus lens 3 to a position capable of obtaining an in-focus image as shown in FIG. 2, in accordance with the movement of the zoom lens 2 and a variation of subject distance.

Figure 3:
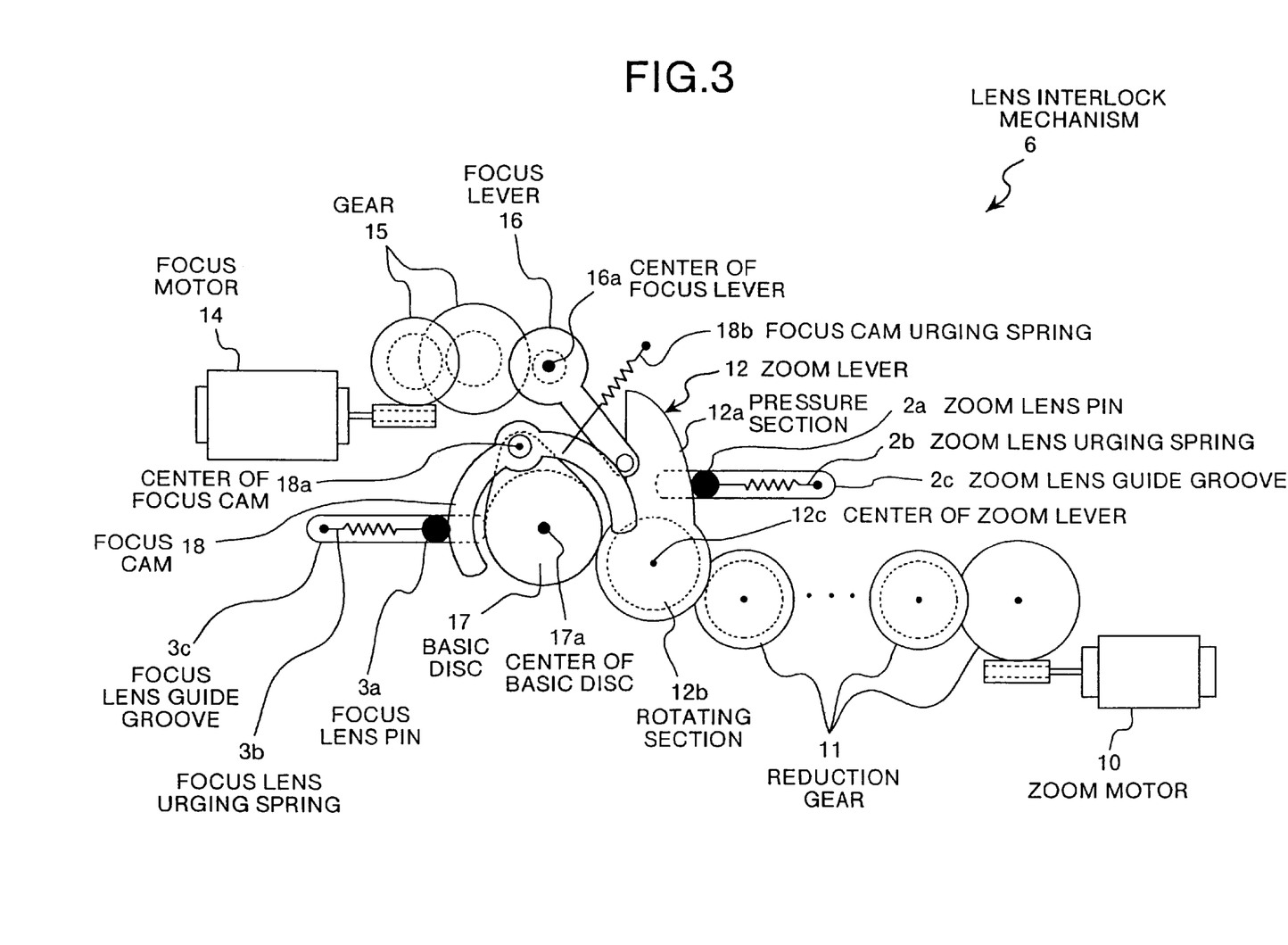
FIG. 3 is a view schematically showing a structure of a lens interlock mechanism unit shown in FIG. 1.

Next, the following is a description on a detailed structure of the lens interlock mechanism 6 shown in FIG. 1. FIG. 3 is a view showing a structure of a lens interlock mechanism 6 shown in FIG. 1. The lens interlock mechanism 6 includes first, second and third drive units.

The first drive unit is a drive unit for directly driving at least the zoom lens 2, and is composed of a zoom motor 10, a reduction gear 11, a zoom lever 12, a zoom lens pin 2*a*, a zoom lens urging spring 2*b* and a zoom lens guide groove 2*c*, as showing in FIG. 3.

The second drive unit a drive unit for indirectly driving the focus lens 3, and is composed of a focus motor 14, a gear 15, and a focus lever 16, as showing in FIG. 3.

The third drive unit is a drive unit for directly driving the focus lens 3 by being driven by the first and second drive units, and is composed of a basic disc 17, a focus cam 18, a focus urging spring 18*b*, a focus lens pin 3*a*, a focus lens urging spring 3*b* and a focus lens guide groove 3*c*, as showing in FIG. 3.

In FIG. 3, the above first drive unit is equivalent to the first driving unit described in the first or third aspect, the second drive unit is equivalent to the second driving unit described in the first aspect, and the third drive unit is equivalent to the third driving unit described in the first or second aspect. The structure of these first, second and third drive units will be described in detail below.

First, the first drive unit will be described with reference to FIG. 3. In FIG. 3, the first drive unit moves the zoom lens 2 to the optical axis direction of the zoom lens 2 while giving a predetermined first driving force corresponding to the movement of zoom lens 2 to the third drive unit.

In the first drive unit, based on an external operation by a photographer (e.g., lens position instruction by zoom button, etc.), the zoom motor 10 is a power source for generating a driving force required for moving the zoom lens 2 to a desired lens position such as WIDE, MEAN and TELE by its rotation.

The reduction gear 11 is a transmission unit for transmitting a driving force generated by the zoom motor 10 to the zoom lever 12, and more specifically, is composed of a plurality of gears engaged with each other. Further, the reduction gear 11 is rotated by the rotation of zoom motor 10, and thereby, transmits a driving force to the zoom lever 12.

When receiving the driving force transmitted by the reduction gear 11, the zoom lever 12 moves the zoom lens 2 to the optical axis direction of the zoom lens 2 while transmitting a predetermined first driving force to the third drive unit. The zoom lever 12 is equivalent to a lever described in the third aspect.

More specifically, as shown in FIG. 3, the zoom lever 12 has a rotating section 12*b* and a rod-like urging section 12*a*, which are formed integrally with each other. The rotating section 12*b* is engaged with the basic disc 17 of the third drive unit while being engaged with the reduction gear 11. The rod-like urging section 12*a* is extended from the rotating section 12*b* to the zoom lens 2 side so as to push the zoom lens 2.

Further, the zoom lever 12 moves the zoom lens 2 to the optical axis direction in a manner that the rotating section 12*b* is rotated around the center 12*c* of the zoom lever by the rotation of the reduction gear 11, and the pressure section 12*a* pushes the zoom lens pin 2*a* by the rotation of the rotating section 12*b*. Simultaneously, the zoom lever 12 transmits a predetermined first driving force to the third drive unit by the rotation of the rotating section 12*b* (i.e., basic disc 17 is rotated around the center 17*a* of the basic disc by the rotation of the rotating section 12*b*).

The predetermined first driving force transmitted to the third drive unit by the zoom lever 12 corresponds to the movement of the zoom lens 2. More specifically, as shown in FIG. 2, an in-focus position of the focus lens 3 varies by the movement of the zoom lens 2. For this reason, the zoom lever 12 transmits a driving force corresponding to the movement of the zoom lens 2 to the third drive unit so that the third drive unit moves the focus lens 3 in accordance with the movement of the zoom lens 2.

Namely, as shown in FIG. 2, a proper feed of the focus lens 3 becomes large in its quadratic curve in accordance with the movement of the zoom lens 2 to the TELE direction. For this reason, the zoom lever 12 rotates the basic disc 17 of the third drive unit so that the focus lens 3 is moved largely in its quadratic curve in accordance with the movement of the zoom lens 2 to the TELE direction.

In the case where the zoom lever 12 rotates at a uniform speed, the pressure section 12*a* of the zoom lever 12 shown in FIG. 3 has a curved shape capable of moving the zoom lens 2 to the optical axis direction at a uniform speed. However, in this case, the pressure section 12*a* is not limited to the above curved shape; for example, the pressure section 12*a* may have a shape such that a moving speed of the optical axis direction becomes low as the zoom lens 2 approaches the TELE end or the WIDE end.

Next, the following is a description on the zoom lens pin 2*a*, the zoom lens urging spring 2*b* and the zoom lens guide groove 2*c*. The zoom lens pin 2*a* is a guide pin, which is provide data circumference of the zoom lens 2. Therefore, the zoom lens 2 is moved integrally with the zoom lens pin 2*a*.

The zoom lens urging spring 2*b* is a spring, which is interposed between a lens barrel encapsulating the zoom lens 2 and the zoom lens 2. By the zoom lens urging spring 2*b*, the zoom lens 2 is urged to the zoom lever 12 side, and thereby, the zoom lever 12 and the zoom lens pin 2*a* are in a state of always contacting with each other. Thus, the zoom lens 2 is always moved with a rotation of the zoom lever 12.

The zoom lens guide groove 2*c* is a groove, which is provided linearly in the optical axis direction in the lens barrel. By the zoom lens guide groove 2*c*, the zoom lens pin 2*a* projects from the lens barrel so as to contact with the zoom lever 12. Thus, the zoom lens 2 is always moved to the optical axis direction.

The first drive unit is not limited to the above description, and may be properly changed so long as it moves the zoom lens 2 to the optical axis direction while transmitting a driving force corresponding to the movement of the zoom lens 2 (position of the zoom lens 2) to the third drive unit.

Next, the second drive unit will be described below with reference to FIG. 3. In FIG. 3, the second drive unit gives a predetermined second driving force corresponding to a distance between the subject to the third drive unit.

In the second drive unit, the focus motor 14 is a power source, which generates a driving force required for moving the focus lens 3 by a rotation, based on a sequentially changing subject distance. In this case, the subject distance is measured by a well-known method (e.g., measurement by light receiving device such as CCD 5, etc.)

The gear 15 is a transmission part for transmitting a driving force generated by the focus motor 14 to the focus lever 16. More specifically, the gear 15 is composed of a plurality of gears engaged with each other. The gear 15 is rotated with a rotation of the focus motor 14, and thereby, transmits a driving force to the focus lever 16.

The focus lever 16 is a transmission part, which receives a driving force transmitted by the gear 15, and transmits a predetermined second driving force to the third drive unit. More specifically, as shown in FIG. 3, the focus lever 16 has a rotating section and a rod-like urging section, which are formed integrally with each other. The rotating section is engaged with the gear 15, and the rod-like urging section is extended from the rotating section to the focus cam 18 side of the third drive unit so as to push the focus cam 18.

Further, the focus lever 16 transmits a predetermined second driving force to the third drive unit in the following manner. More specifically, the rotating section is rotated around the focus lever center 16*a* with a rotation of the gear 15, and the pressure section pushes the focus cam 18 of the third drive unit with a rotation of the rotating section (the focus cam 18 is rotated around the focus cam center 18*a* with the rotation of the rotating section).

The above predetermined second driving force transmitted to the third drive unit by the focus lever 16 corresponds to a subject distance. More specifically, as shown in FIG. 2, an in-focus position of the focus lens 3 varies not only the movement of the zoom lens 2 but also a variation of subject distance. For this reason, the focus lever 16 transmits a driving force corresponding to the subject distance to the third drive unit so that the focus lens 3 is moved in accordance with a variation of subject distance by the third drive unit.

Namely, as shown in FIG. 2, a proper feed of the focus lens 3 becomes larger in its quadratic curve in accordance with a variation to a short distance direction of the subject distance. Thus, the focus lever 16 rotates the focus cam 18 of the third drive unit so that the focus lens 3 is moved largely in its quadratic curve in accordance with a variation to a short distance direction of the subject distance.

The second drive unit is not limited to the above description, and may be properly changed so long as it transmits a predetermined driving force corresponding to the subject distance to the third drive unit. For example, the predetermined driving force corresponding to the subject distance may be transmitted directly to the third drive unit without using the focus lever 16.

Next, the third drive unit will be described below with reference to FIG. 3. In FIG. 3, the third drive unit receives each predetermined driving force transmitted from the first and second drive units, and thereby, moves the focus lens 3 to the optical axis direction while keeping a predetermined relation to the zoom lens 2 based on the distance to the subject.

In the third drive unit, the basic disc 17 supports the focus cam 18 so that the focus cam 18 is rotatable around the focus cam center 18*a*, and is rotated around the basic disc center 17*a* when receiving the predetermined first driving force transmitted from the zoom lever 12. The basic disc 17 is equivalent to the basic disc described in the second aspect.

Further, the basic disc 17 has a rotating section, and a supporting section, which are formed integrally with each other as shown in FIG. 3. More specifically, the rotating section is engaged with the zoom lever 12 of the first drive unit, and the supporting section supports the focus cam 18 so that the focus cam is rotatable around the focus cam center 18a.

Furthermore, the basic disc 17 rotates the focus cam 18 around the basic disc center 17a in the following manner (the focus cam 18 is revolved with respect to the basic disc 17). More specifically, the rotating section is rotated around the basic disc center 17a with a rotation of the zoom lever 12, and the supporting section is rotated with a rotation of the rotating section.

The focus cam 18 is supported in the basic disc 17 so as to be rotatable around the focus cam center 18a eccentric from the basic disc center 17a, and is rotated when receiving a predetermined second driving force transmitted from the focus lever 16, and thereby, pushes the focus lens 3. The focus cam 18 is equivalent to a cam described in the second aspect.

More specifically, the focus cam 18 has an arc urged section and an arc-like pressure section, which are formed integrally with each other, as shown in FIG. 3. The arc-like urged section is extended to the focus lever 16 side of the second driving unit at both sides of the rotating section rotatably supported on the basic disc 17, and is pushed by the focus lever 16. The arc-like pressure section is extended to the focus lens 3 side, and pushes the focus lens 3 (focus lens pin 3a).

Further, the focus cam center 18a is rotated around the basic disc center 17a with a rotation of the basic disc 17, and thereby, the focus cam 18 is revolved around the basic disc center 17a. Simultaneously, the urged section is urged by the focus lever 16, and thereby, the focus cam 18 rotates around the focus cam center 18a. Thus, the pressure section pushes the focus pin 3a with the revolution and rotation, and thereby, the focus cam 18 moves the focus lens 3 to the optical axis direction.

Figure 4A:
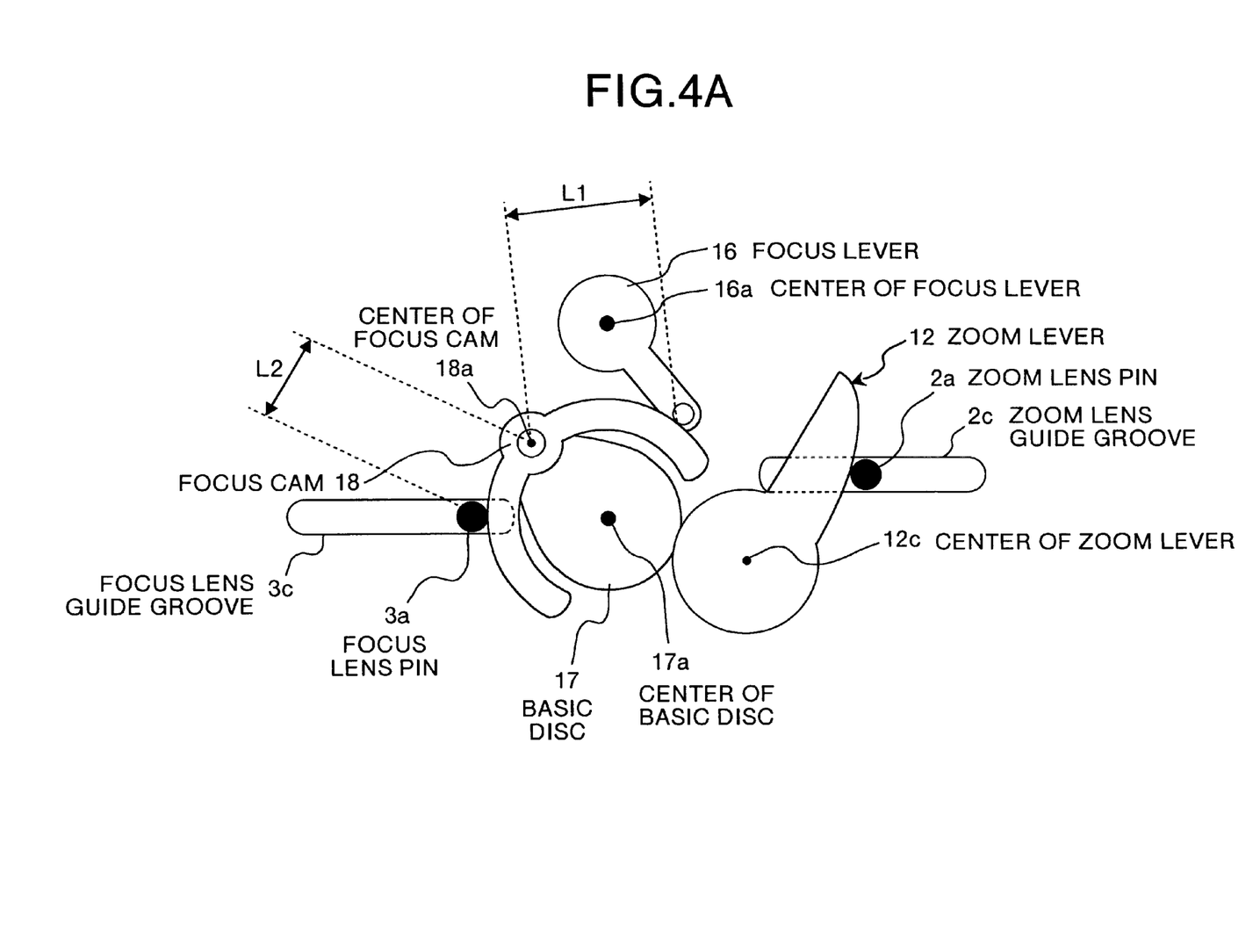
FIG. 4A to FIG. 4C explain movement of focus lens by a focus cam.

Subsequently, the following is a detailed description on the movement of the focus lens 3 by the focus cam 18. FIG. 4 is a view to explain the movement of the focus lens 3 by the focus cam 18. In FIG. 4, FIG. 4A is a view to explain a movement in a WIDE state, FIG. 4B is a view to explain a movement in a MEAN state, and FIG. 4C is a view to explain a movement in a TELE state.

By the way, as shown in FIG. 2, the feed of the focus lens 3 becomes large in its quadratic curve in accordance with the movement of the zoom lens 2 to the TELE direction, and further, becomes large in its quadratic curve in accordance with a variation of subject distance to a short distance direction. Based on the above parameter, as shown in FIG. 4, the focus cam 18 transfers from a urged position by the center of focus cam 18a and the focus lever 16 to an urged position to the focus lens pin 3a. Namely, the focus cam 18 transfers so that the focus lens 3 is moved largely in its quadratic curve in accordance with the movement of the zoom lens 2 to the TELE direction and a variation of subject distance to a short distance direction. The following is a detailed description on the above transfer of the focus cam 18.

As shown in FIG. 4A, in the case where the zoom lens 2 is moved from the MEAN state to the WIDE state, the focus cam center 18a of the focus cam 18 approaches the urged position of the focus lens 3 (the focus cam center 18a is far from the urged position by the focus lever 16). More specifically, a distance L1 between the focus cam center 18a and the urged position becomes gradually short; on the other hand, a distance L2 between the focus cam center 18a and the urged position becomes gradually long. Moreover, a driving force of the focus cam 18 receiving from the focus lever 16 is transmitted to the focus lens 3 gradually smaller than the MEAN state in accordance with a transition of the relation between the distance L1 and the distance L2. By doing so, the focus lens 3 is moved to a focal position corresponding to the subject distance in the vicinity of the WIDE state shown in FIG. 2 by a feed smaller than the MEAN state.

Figure 4B:
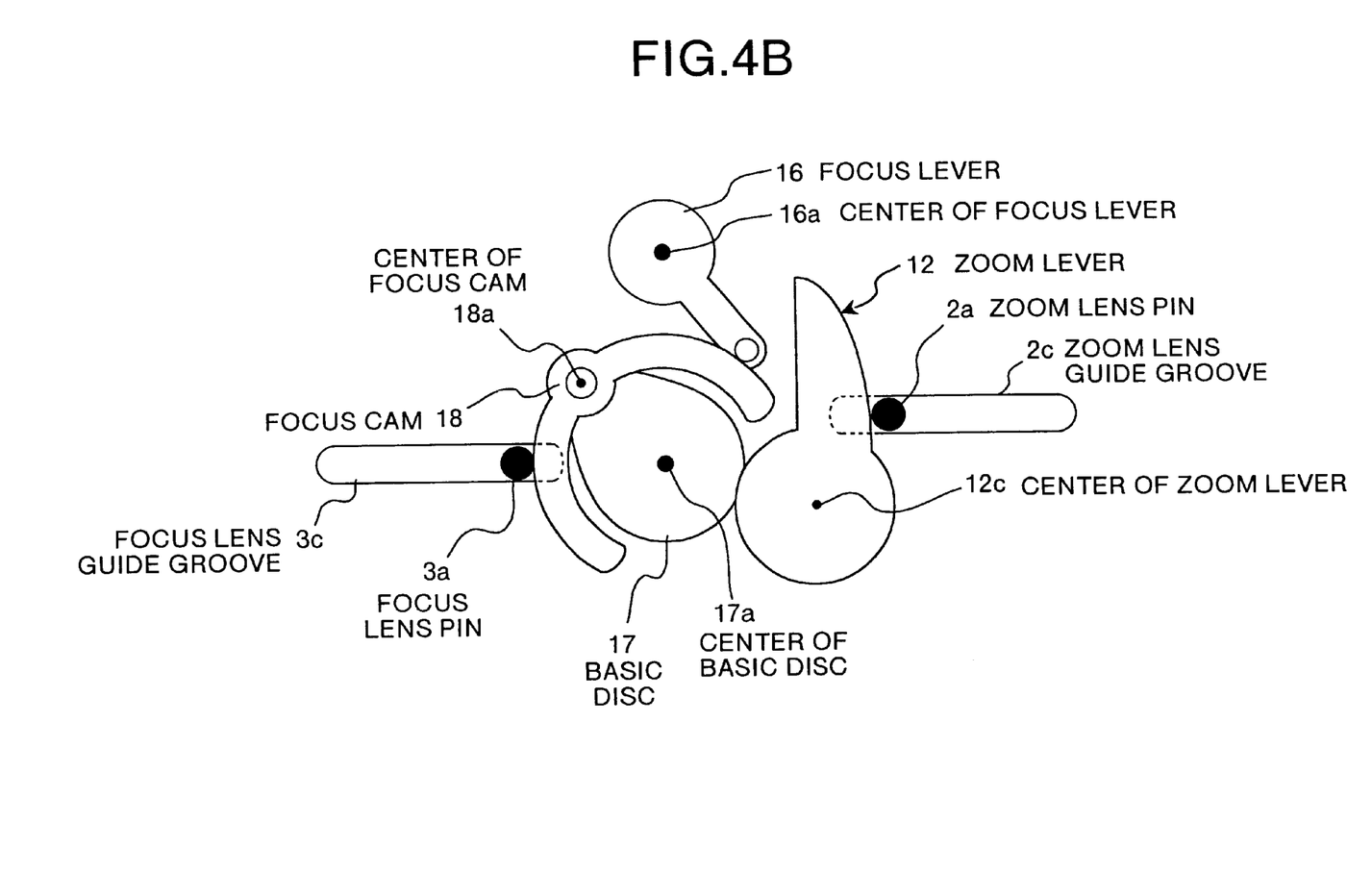
Figure 4C:
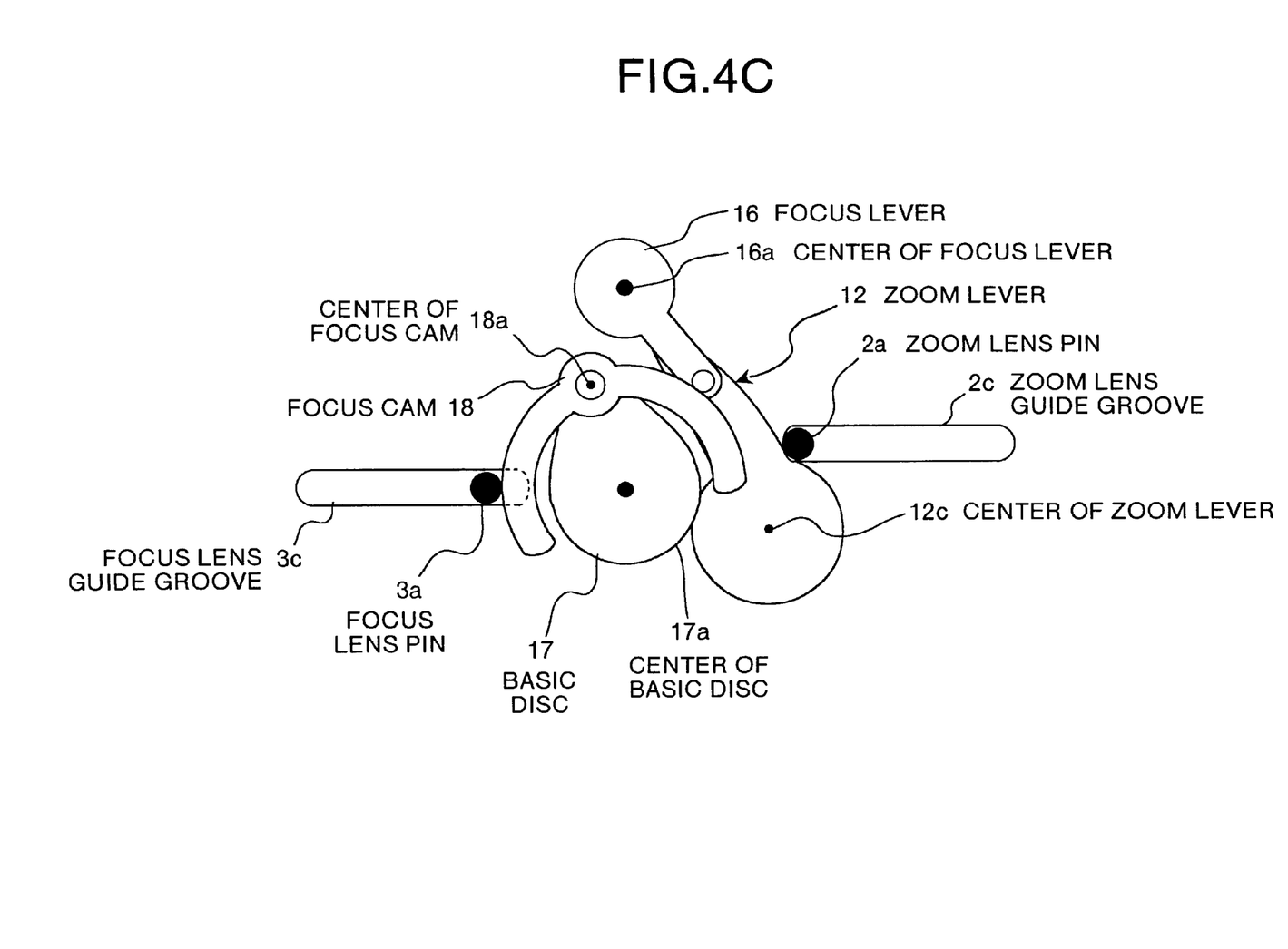

Further, as shown in FIG. 4B, in the case where the zoom lens 2 is moved from the WIDE state to the MEAN state, the focus cam center 18a of the focus cam 18 is far from the urged position of the focus lens 3 (the focus cam center 18a approaches the urged position by the focus lever 16). More specifically, a distance L1 between the focus cam center 18a and the urged position becomes gradually long; on the other hand, a distance L2 between the focus cam center 18a and the urged position becomes gradually short. Moreover, a driving force of the focus cam 18 receiving from the focus lever 16 is transmitted to the focus lens 3 gradually larger than the WIDE state in accordance with a transition of the relation between the distance L1 and the distance L2. By doing so, the focus lens 3 is moved to a focal position corresponding to the subject distance in the vicinity of the MEAN state shown in FIG. 2 by a feed larger than the WIDE state.

Further, as shown in FIG. 4C, in the case where the zoom lens 2 is moved from the MEAN state to the TELE state, the focus cam center 18a of the focus cam 18 is far from the urged position of the focus lens 3 (the focus cam center 18a approaches the urged position by the focus lever 16). More specifically, a distance L1 between the focus cam center 18a and the urged position becomes gradually long; on the other hand, a distance L2 between the focus cam center 18a and the urged position becomes gradually short. Moreover, a driving force of the focus cam 18 receiving from the focus lever 16 is transmitted to the focus lens 3 gradually larger than the MEAN state in accordance with a transition of the relation between the distance L1 and the distance L2. By doing so, the focus lens 3 is moved to a focal position corresponding to the subject distance in the vicinity of the TELE state shown in FIG. 2 by a feed larger than the MEAN state.

Next, the following is a description on the focus lens pin 3a, the focus lens urging spring 3b, the focus lens guide groove 3c and the focus cam urging spring 18b. The focus lens pin 3a is a guide pin, which is provided at a circumferential section of the focus lens 3. By doing so, the focus lens 3 is moved integrally with the focus lens pin 3a.

The focus lens urging spring 3b is a spring, which is interposed between a lens barrel encapsulating the focus lens 3 and the focus lens 3. By doing so, the focus lens 3 is urged to the focus cam 18 side, and thereby, the focus cam 18 and the focus lens pin 3a are in a state of always contacting with each other. Thus, the focus lens 3 is always moved with a rotation of the focus cam 18.

The focus lens guide groove 3c is a groove, which is provided linearly in the optical axis direction in the lens barrel. By doing so, the focus lens pin 3a projects from the lens barrel so as to contact with the focus cam 18. Thus, the focus lens 3 is always moved to the optical axis direction.

The focus cam urging spring 18b is a spring, which is interposed between the lens barrel and the focus cam 18. By doing so, the focus cam 18 is urged to the focus lever 16 side, and thereby, the focus cam 18 and the focus lever 16 are in a state of always contacting with each other. Thus, the focus cam 18 is always rotated with a rotation of the focus lever 16.

The above third drive unit is not limited to the above description, and may be properly changed so long as it moves the focus lens 3 to a focal position by receiving a driving force corresponding to the movement of the zoom lens 2 and a driving force corresponding to the subject distance. For example, a shape of the focus cam 18 may be changed, and the basic disc 17 and the focus cam 18 may be integrally formed.

As described above, according to this preferred embodiment, the lens interlock mechanism 6 interlocks the zoom lens 2 and the focus lens 3, and further, includes the following first to third drive units. More specifically, the first drive unit moves the zoom lens 2 to the optical axis direction of the zoom lens while giving a predetermined first driving force corresponding to the movement of the zoom lens 2 to the third drive unit. The second drive unit gives a predetermined second driving force corresponding to a distance between the subject to the third drive unit. The third drive unit is driven by receiving the predetermined driving force given from the first and second drive units. By doing so, the focus lens 3 is moved to the optical axis direction of the focus lens while keeping a predetermined relation to the zoom lens 2 based on the distance to the subject. Thus, the third drive unit receives the driving force corresponding to the movement of the zoom lens 2 and the driving force corresponding to the subject distance, and thereby, the focus lens 3 can be always moved in accordance with the movement of the zoom lens 2 and the subject distance. Therefore, it is possible to smoothly and continuously move the focus lens 3 in accordance with an in-focus position of the focus lens 3 continuously variable with the movement of the zoom lens 2 and a variation of subject distance. Further, it is possible to smoothly and continuously produce an image having almost no out-of-focus during a zooming operation.

Further, according to this preferred embodiment, the third drive unit includes the basic disc 17 and the focus cam 18. More specifically, the basic disc 17 is rotated by receiving the predetermined first driving force given from the first drive unit. The focus cam 18 is rotatably supported on the basic disc 17 at a position eccentric from the basic disc center 17a (focus cam center 18a), and is rotated by receiving the predetermined driving force given from the second drive unit, and thereby, urges the focus lens 3. The basic disc 17 is rotated with the movement of the zoom lens 2 to the TELE direction, and thereby, the focus cam center 18a approaches the urged position of the focus cam 18 while being far from the urging position of the focus cam 18. Thus, in the focus cam 18, when the distance between the support shaft and the urging position becomes long with the movement of the zoom lens 2 to the TELE direction, the movement of the focus lens 3 by the second driving force can be made large in its quadratic curve with the movement of the zoom lens 2 to the TELE direction. Therefore, it is possible to move the focus lens 3 based on the quadratic curve movement in accordance with an in-focus position of the focus lens 3 variable in its quadratic curve with the movement of the zoom lens 2 to the TELE direction. Further, it is possible to smoothly and continuously produce an image having almost no out-of-focus during a zooming operation.

Further, according to this preferred embodiment, the first drive unit includes the zoom lever 12 having rotating section 12b and pressure section 12a. More specifically, the rotating section 12b is engaged with the basic disc 17, and the pressure section 12a is extended from the rotating section 12b to the zoom lens 2 side so as to urge the zoom lens 2. By doing so, the zoom lens 2 is moved, and the first driving force is given to the third drive unit by only one zoom lever 12. Therefore, by a simple structure, it is possible to move the focus lens 3 in accordance with the movement of the zoom lens 2.

In this preferred embodiment, by the lens interlock mechanism 6, it is possible to always project a subject image imaged on the CCD 5 by interlocking the zoom lens 2 and the focus lens 3 on a monitor or the like in accordance with the movement of the zoom lens 2 and a variation of subject distance.

By the way, the number of pixels of monitor built in a camera or the like is less than that of the CCD 5. For this reason, even in the case where the position of the focus lens 3 slightly diverges from an in-focus point required for photography, it is impossible to recognize an out-of-focus in an image projected on the monitor. Therefore, in the image projected on the monitor, there is no need of moving the focus lens 3 so that the out-of-focus is not always made zero. More specifically, the focus lens 3 may be moved so that an image, which is not recognized as an out-of-focus, can be projected on the monitor, in accordance with the movement of the zoom lens 2 and a variation of subject distance.

Thus, the lens interlock mechanism 6 of this embodiment moves the focus lens 3 so that a coarse in-focus image is obtained, and thereby, it is possible to more quickly move the zoom lens. In this case, before photography recording (recording to memory card), a CCDAF (auto-focus) or the like is operated, and then, the focus lens 3 is moved, and thereby, it is possible to find an in-focus point required for photography at a short time.

The above preferred embodiment has described the case where the lens interlock mechanism 6 interlocks the zoom lens 2 and the focus lens 3. The present invention is not limited to this embodiment, and the number of lenses and the combination thereof may be properly changed. For example, a plurality of zoom lenses 2 and the focus lens 3 may be interlocked.

The above lens interlock mechanism and method may be properly used in a camera or portable terminal, for example.

As is evident from the above description, according to the first aspect of the present invention, the first drive unit moves the zoom lens along the optical axis direction of the zoom lens while giving a predetermined first driving force corresponding to the movement of the zoom lens to the third drive unit. The second drive unit gives a predetermined second driving force corresponding to a distance between the subject to the third drive unit. The third drive unit is driven by receiving the predetermined driving force given from the first and second drive units, and thereby, moves the focus lens to the optical axis direction of the focus lens while keeping a predetermined relation to the zoom lens based on the distance to the subject. Therefore, it is possible to obtain a lens interlock mechanism, which can smoothly and continuously produce an image having almost no out-of-focus during a zooming operation.

Further, according to the second aspect of the present invention, the basic disc is rotated with the movement of the zoom lens to the TELE direction, and thereby, the supporting shaft of the cam approaches the urged position of the second driving force while being far from the urging position of the cam. Therefore, it is possible to obtain a lens interlock mechanism, which can smoothly and continuously produce an image having almost no out-of-focus during a zooming operation.

Further, according to the third aspect of the present invention, in the lever, the rotating section is engaged with the basic disc, and the pressure section is extended from the rotating section to the zoom lens side so as to urge the zoom lens. Therefore, by a simple structure, it is possible to obtain a lens interlock mechanism, which can move the focus lens in accordance with the movement of the zoom lens.

The present document incorporates by reference the entire contents of Japanese priority document, 2000-143488 filed in Japan on May 16, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A lens interlock mechanism for interlocking a zoom lens and a focus lens, comprising:
    a first driving unit including a disk and a cam which directly drives at least said zoom lens;
    a second driving unit which indirectly drives said focus lens; and
    a third driving unit which directly drives said focus lens by being driven by said first and second driving units, wherein
        said first driving unit moves said zoom lens along an optical axis direction of said zoom lens by use of the cam while giving a first driving force corresponding to the movement of the zoom lens to said third driving unit by the use of the disk;
        said second driving unit gives a second driving force corresponding to a distance from the subject to said third driving unit; and
        said third drive unit receives the first and second driving force and thereby moves said focus lens along the optical axis direction of said focus lens while keeping a predetermined relation to said zoom lens based on the distance to the subject.

2. A lens interlock mechanism for interlocking a zoom lens and a focus lens, comprising:
    a first driving unit which directly drives at least said zoom lens;
    a second driving unit which indirectly drives said focus lens; and
    a third driving unit which directly drives said focus lens by being driven by said first and second driving units, wherein
        said first driving unit moves said zoom lens along an optical axis direction of said zoom lens while giving a first driving force corresponding to the movement of the zoom lens to said third driving unit;
        said second driving unit gives a second driving force corresponding to a distance from the subject to said third driving unit; and
        said third drive unit receives the first and second driving force and thereby moves said focus lens along the optical axis direction of said focus lens while keeping a predetermined relation to said zoom lens based on the distance to the subject,
    wherein the third driving unit includes,
        a basic disc which rotates by receiving the first driving force; and
        a cam which is rotatably supported on said basic disc at a position eccentric from the center of rotation of said basic disc, and rotated by receiving the second driving force so as to urge said focus lens, wherein
            said basic disc being rotated with the movement of said zoom lens to the TELE direction, and thereby, approaching a supporting shaft of the cam to an urged position of the second driving force in the cam while being far from an urging position in said cam.

3. The lens interlock mechanism according to claim 2, wherein said first driving unit has a lever that includes a rotating section engaged with said basic disc; and a pressure section extended from said rotating section to said zoom lens so as to urge said zoom lens.

4. A lens interlock mechanism for interlocking a zoom lens and a focus lens, comprising:
    a first driving means for directly driving at least said zoom lens by use of a cam;
    a second driving means for indirectly driving said focus lens; and
    a third driving means for directly driving said focus lens by being driven by said first and second driving means, wherein
        said first driving means moves said zoom lens along an optical axis direction of said zoom lens by use of the cam while giving a first driving force corresponding to the movement of the zoom lens to said third driving means by use of the disk;
        said second driving means gives a second driving force corresponding to a distance from the subject to said third driving means; and
        said third drive means receives the first and second driving force and thereby moves said focus lens along the optical axis direction of said focus lens while keeping a predetermined relation to said zoom lens based on the distance to the subject.

5. A lens interlock mechanism for interlocking a zoom lens and a focus lens, comprising:
    a first driving means for directly driving at least said zoom lens;
    a second driving means for indirectly driving said focus lens; and
    a third driving means for directly driving said focus lens by being driven by said first and second driving means, wherein
        said first driving means moves said zoom lens along an optical axis direction of said zoom lens while giving a first driving force corresponding to the movement of the zoom lens to said third driving means;
        said second driving means gives a second driving force corresponding to a distance from the subject to said third driving means; and
        said third drive means receives the first and second driving force and thereby moves said focus lens along the optical axis direction of said focus lens while keeping a predetermined relation to said zoom lens based on the distance to the subject,
    wherein the third driving means includes,
        a basic disc which rotates by receiving the first driving force; and
        a cam which is rotatably supported on said basic disc at a position eccentric from the center of rotation of said basic disc, and rotated by receiving the second driving force so as to urge said focus lens, wherein
            said basic disc being rotated with the movement of said zoom lens to the TELE direction, and thereby, approaching a supporting shaft of the cam to an urged position of the second driving force in the cam while being far from an urging position in said cam.

6. The lens interlock mechanism according to claim 5, wherein said first driving means has a lever that includes a rotating section engaged with said basic disc; and a pressure section extended from said rotating section to said zoom lens so as to urge said zoom lens.

7. A lens interlock method for interlocking a zoom lens and a focus lens, comprising:
   a first driving step which directly drives at least said zoom lens with a disk and a cam;
   a second driving step which indirectly drives said focus lens; and
   a third driving step which directly drives said focus lens by being driven by said first and second driving steps, wherein
      said first driving step moves said zoom lens along an optical axis direction of said zoom lens by the use of the cam while giving a first driving force corresponding to the movement of the zoom lens to said third driving step by the use of the disk;
      said second driving step gives a second driving force corresponding to a distance from the subject to said third driving step; and
      said third drive step receives the first and second driving force and thereby moves said focus lens along the optical axis direction of said focus lens while keeping a predetermined relation to said zoom lens based on the distance to the subject.

8. A camera having a lens interlock mechanism for interlocking a zoom lens and a focus lens, comprising:
   a first driving unit including a disk and a cam which directly drives at least said zoom lens;
   a second driving unit which indirectly drives said focus lens; and
   a third driving unit which directly drives said focus lens by being driven by said first and second driving units, wherein
      said first driving unit moves said zoom lens along an optical axis direction of said zoom lens by the use of the cam while giving a first driving force corresponding to the movement of the zoom lens to said third driving unit by the use of the disk;
      said second driving unit gives a second driving force corresponding to a distance from the subject to said third driving unit; and
      said third drive unit receives the first and second driving force and thereby moves said focus lens along the optical axis direction of said focus lens while keeping a predetermined relation to said zoom lens based on the distance to the subject.

9. The camera having the lens interlock mechanism, comprising:
   a first driving unit which directly drives at least said zoom lens;
   a second driving unit which indirectly drives said focus lens; and
   a third driving unit which directly drives said focus lens by being driven by said first and second driving units, wherein
      said first driving unit moves said zoom lens along an optical axis direction of said zoom lens while giving a first driving force corresponding to the movement of the zoom lens to said third driving unit;
      said second driving unit gives a second driving force corresponding to a distance from the subject to said third driving unit; and
      said third drive unit receives the first and second driving force and thereby moves said focus lens along the optical axis direction of said focus lens while keeping a predetermined relation to said zoom lens based on the distance to the subject,
   wherein the third driving unit includes,
      a basic disk which rotates by receiving the first driving force; and
      a cam which is rotatably supported on said basic disc at a position eccentric from the center of rotation of said basic disc, and rotated by receiving the second driving force so as to urge said focus lens, wherein
         said basic disc being rotated with the movement of said zoom lens to the TELE direction, and thereby, approaching a supporting shaft of the cam to an urged position of the second driving force in the cam while being far from an urging position in said cam.

10. The camera having the lens interlock mechanism according to claim 9, wherein said first driving unit has a lever that includes a rotating section engaged with said basic disc; and a pressure section extended from said rotating section to said zoom lens so as to urge said zoom lens.

11. A portable terminal having a lens interlock mechanism for interlocking a zoom lens and a focus lens, comprising:
   a first driving unit including a disk and a cam which directly drives at least said zoom lens;
   a second driving unit which indirectly drives said focus lens; and
   a third driving unit which directly drives said focus lens by being driven by said first and second driving units, wherein
      said first driving unit moves said zoom lens along an optical axis direction of said zoom lens by use of the cam while giving a first driving force corresponding to the movement of the zoom lens to said third driving unit by the use of the disk;
      said second driving unit gives a second driving force corresponding to a distance from the subject to said third driving unit; and
      said third drive unit receives the first and second driving force and thereby moves said focus lens along the optical axis direction of said focus lens while keeping a predetermined relation to said zoom lens based on the distance to the subject.

12. The portable terminal having the lens interlock mechanism comprising:
   a first driving unit which directly drives at least said zoom lens;
   a second driving unit which indirectly drives said focus lens; and
   a third driving unit which directly drives said focus lens by being driven by said first and second driving units, wherein
      said first driving unit moves said zoom lens along an optical axis direction of said zoom lens while giving a first driving force corresponding to the movement of the zoom lens to said third driving unit;
      said second driving unit gives a second driving force corresponding to a distance from the subject to said third driving unit; and
      said third drive unit receives the first and second driving force and thereby moves said focus lens along the optical axis direction of said focus lens while keeping a predetermined relation to said zoom lens based on the distance to the subject, wherein the third driving unit includes,
  a basic disc which rotates by receiving the first driving force; and
  a cam which is rotatably supported on said basic disc at a position eccentric from the center of rotation of said basic disc, and rotated by receiving the second driving force so as to urge said focus lens, wherein
    said basic disc being rotated with the movement of said zoom lens to the TELE direction, and thereby, approaching a supporting shaft of the cam to an urged position of the second driving force in the cam while being far from an urging position in said cam.

13. The portable terminal having the lens interlock mechanism according to claim 12, wherein said first driving unit has a lever that includes a rotating section engaged with said basic disc; and a pressure section extended from said rotating section to said zoom lens so as to urge said zoom lens.

* * * * *